United States Patent [19]

Seifert

[11] Patent Number: 5,050,340
[45] Date of Patent: Sep. 24, 1991

[54] PNEUMATIC SOIL PENETRATOR AND CHEMICAL APPLICATOR ASSEMBLY

[76] Inventor: L. Eugene Seifert, 557 W. 4800 South, Ogden, Utah 84405

[21] Appl. No.: 522,548

[22] Filed: May 14, 1990

[51] Int. Cl.⁵ ............................................. A01G 29/00
[52] U.S. Cl. ...................................... 47/48.5; 47/1.01; 239/271
[58] Field of Search .................. 47/48.5, 1.01; 239/271, 239/272, 310, 318, 8; 222/225, 630

[56] References Cited

U.S. PATENT DOCUMENTS

| | | | |
|---|---|---|---|
| 2,242,789 | 5/1941 | McFee | 239/271 |
| 2,302,799 | 11/1942 | Peterson | 239/310 X |
| 2,505,174 | 4/1950 | Daniels | 239/271 X |
| 2,713,834 | 7/1955 | Shirley | 239/271 X |
| 3,405,669 | 10/1968 | Nimrick | 239/310 X |
| 4,039,105 | 8/1977 | Chan | 239/318 X |
| 4,170,948 | 10/1979 | Strickland | 47/48.5 X |
| 4,247,046 | 1/1981 | Hechler, IV | 239/318 |
| 4,883,086 | 11/1989 | Lejnar | 239/318 X |

Primary Examiner—Richard E. Chilcot, Jr.
Assistant Examiner—Linda J. Watson
Attorney, Agent, or Firm—Phillip A. Rein

[57] ABSTRACT

This invention relates to a pneumatic soil penetrator and chemical applicator assembly operable, for example, to penetrate a soil surface and discharge a chemical toward the root system on a tree member or to broadcast the chemical about a large area. The pneumatic soil penetrator and chemical applicator assembly includes (1) a penetrator and applicator connected to a pneumatic supply to provide air pressure thereto; and (2) a chemical supply connected to the penetrator and applicator. The penetrator and applicator includes a main gun assembly having a primary inlet assembly; a main discharge assembly; and a control handle assembly in order to provide for selective control of fluid and chemical flow for (1) conveyance of the fluid flow and chemical therethrough; and (2) high pressure fluid flow to be used in a digging or penetration of the soil area. The primary inlet assembly includes a chemical inlet assembly having a venturi valve assembly utilized to pick up the chemical to be discharged therefrom from the chemical supply. The pneumatic soil penetrator and chemical applicator assembly is provided with an air deflector assembly operable to provide a seal with an upper surface of the soil area to direct the fluid flow downwardly for penetration purposes. The pneumatic soil penetrator and chemical applicator assembly includes a directional broadcaster assembly operable to be secured to an outer end of the main discharge assembly to direct the fluid and chemical flow downwardly for effective and efficient distribution thereof. The pneumatic soil penetrator and chemical applicator assembly is provided with an auxillary chemical supply assembly to provide for chemical discharge on a controlled limited amount.

20 Claims, 3 Drawing Sheets

Fig_9

Fig_10

Fig_11

Fig_12

PNEUMATIC SOIL PENETRATOR AND CHEMICAL APPLICATOR ASSEMBLY

PRIOR ART

A patent search on the above identified invention was not conducted as the applicant herein has had considerable experience in this area and, therefore, a search was not deemed necessary.

PREFERRED EMBODIMENT OF THE INVENTION

In one preferred embodiment of this invention, a pneumatic soil penetrator and chemical applicator assembly is provided to be used by an operator to apply a liquid or granular chemical through a soil surface to root members on a tree member or generally impregnate a large soil area with a special chemical product. The pneumatic soil penetrator and chemical applicator assembly includes (1) a penetrator and applicator means; (2) a pneumatic supply means connected to the penetrator and applicator means to present a pressure air or fluid flow thereto; and (3) a chemical supply means connected to the penetrator and applicator means and operable through the pneumatic supply means to pick up and supply the chemical in a predetermined condition to a specific location. The penetrator and applicator means includes an applicator gun means including (1) a main gun assembly; (2) an auxillary chemical supply assembly mounted on the main gun assembly; (3) an air deflector assembly mounted on the main gun assembly; and (4) a directional broadcaster assembly mounted on an outer end of the main gun assembly. The main gun assembly includes (1) a primary inlet means or assembly; (2) a housing cover assembly mounted about the primary inlet means; (3) a main discharge assembly connected to the primary inlet means; and (4) a control handle assembly. The primary inlet means includes (1) a fluid inlet means or assembly; (2) a chemical inlet means or assembly; and (3) a fluid penetrator means or assembly. The fluid inlet assembly includes a fluid inlet tube member connected through a first on/off control valve member to a fluid conveyance tube member. The chemical inlet assembly includes (1) a connector tube member; (2) a second on/off control valve member; and (3) a venturi valve assembly. The venturi valve assembly includes (1) a fluid supply tube connected to the fluid inlet tube member and having the second on/off control valve member mounted therein; (2) an outer transfer tube connected from the second on/off control valve member; (3) a third on/off control valve member mounted in the connector tube member of the chemical inlet assembly and connected to the outer transfer tube through a chemical inlet opening; and (4) a discharge tube member connects the outer transfer tube to the main discharge assembly. The venturi valve assembly includes (1) an inner venturi tube connected to a discharge side of the second on/off control valve member and mounted centrally of the discharge tube member. A discharge opening from the inner venturi tube is downstream of the chemical inlet opening to create a vacuum pressure in this area to achieve a venturi action condition. The fluid penetrator assembly includes a connector tube section connected to the fluid supply tube, a fourth on/off control valve member mounted in the connector tube section, and an inner fluid supply tube connected from an output side of the fourth on/off control valve member to the main discharge assembly. The fluid inlet assembly, the chemical inlet assembly, and the fluid penetrator assembly are all interconnected on output sides to the main discharge assembly. The main discharge assembly includes a main discharge tube member having a discharge penetrator assembly secured to an outer end thereof. The discharge penetrator assembly includes angularly spaced discharge openings and an outer tapered penetrator member. The tapered penetrator member includes a central discharge channel connected to the fluid supply tube to receive pressure fluid therefrom; discharge line and openings connected to the discharge channel; and outer fin members to direct air flow and aid in penetrating the soil area. The control handle assembly includes (1) a first handle member mounted about the fluid inlet tube member of the fluid inlet assembly; (2) a dual handle assembly; and (3) an adjustable handle assembly. The dual handle assembly extends outwardly from both sides of the housing cover assembly and is provided with an outer grip member thereon. This dual handle assembly allows for the equipment to be grasped on either side by a right or left handed operator. The adjustable handle assembly includes a handle grip member secured to a connector tube member. The connector tube member is mounted about the main discharge tube member and having a thumb screw thereon so it can be axially moveable thereon and locked in a desired adjusted position. The auxillary chemical supply assembly includes a supply bottle member connected to a fifth on/off control valve member and, in turn, to a chemical supply line. The chemical supply line is connected through a discharge opening to the main discharge tube member of the main discharge assembly. The supply bottle member is operable to receive a chemical therein for controlled discharge through use of the fifth on/off control valve member. The air deflector assembly includes a conical main body member connected through a flexible connector member to a lower portion of the main discharge tube member of the main discharge assembly. The conical main body member is provided with a tapered main side wall integral with a top wall member. The top wall member is provided with an arcuate peripheral edge and a central opening having the flexible connector member mounted therein. The flexible connector member is provided with a connector opening which is operable to be engagable in a sealing manner with the main discharge tube member providing for pivotal flexible movement of the entire air deflector assembly. The directional broadcaster assembly is provided with a broadcaster tube member integral with a connector assembly. The broadcaster tube member is provided with a tapered side wall integral with a cylindrical outer side wall and operable to be mounted about and adjustably axially moveable on the main discharge tube member. The connector assembly is provided with a connector tube secured to the tapered side wall and having a thumb screw member mounted therein. The connector tube is provided with an anchor opening to receive the thumb screw member so it can be axially adjusted and secured at a given position on the main discharge tube member. The pneumatic supply means includes an air compressor assembly of a conventional nature used to provide fluid inlet flow to the primary inlet assembly. The chemical supply means includes a chemical supply tank or barrel connected through a chemical discharge line and a flow control valve to the third on/off control valve member of the chemical inlet assembly.

OBJECTS OF THE INVENTION

One object of this invention is to provide a pneumatic soil penetrator and chemical applicator assembly utilizing a pneumatic supply means in conjunction with a chemical supply means interconnected to a penetrator and applicator means which is operable to penetrate a soil area about root members of a tree member for injecting a chemical through the use of fluid pressure to subject root system.

Another object of this invention is to provide a pneumatic soil penetrator and chemical applicator assembly including a main gun assembly connected to a main discharge assembly which can be inserted within a soil area to discharge a fluid medium conveying a chemical through a tapered penetrator member having discharge channels to achieve subject discharge outwardly and laterally therefrom.

One other object of this invention is to provide a pneumatic soil penetrator and chemical applicator assembly including an applicator gun means having numerous control members thereon to control (1) pressure and volume of inlet fluid flow; (2) pressure and volume of inlet fluid flow using a venturi action to convey a chemical for subsequent discharge; and (3) an inner air supply connected outwardly to a discharge opening at an outer end of the applicator gun means to provide a high pressure fluid flow for penetration of a soil area.

One more object of this invention is to provide a pneumatic soil penetrator and chemical applicator assembly which is of generally light weight being easy to manipulate and use; provided with controls thereon to regulate the flow of chemicals and a discharge fluid medium in a desired manner; and provided with a chemical supply means which can be readily controlled to monitor the amount of chemical being dispensed therefrom.

One further object of this invention is to provide a pneumatic soil penetrator and chemical applicator assembly including a penetrator and applicator means having a specially designed air deflector assembly being operable so as to be pivotal about a central axis and provide a sealed engagement with the soil after being penetrated to cause fluid flow with a chemical therein to move laterally outwardly to penetrate a large area beneath an upper soil surface with the chemical.

One additional object of this invention is to provide a pneumatic soil penetrator and chemical applicator assembly including a penetrator and applicator means having a directional broadcaster assembly secured to a discharge end operable to direct an output fluid flow with a chemical threin to a desired specific location.

Still, one other object of this invention is to provide a pneumatic soil penetrator and chemical applicator assembly having a penetrator and applicator means with a main gun assembly which can be readily conveyed, lifted, and manipulated by an operator being of generally solid construction; easy to operate; economical to manufacture; and substantially maintenance free.

Various other objects, advantages, and features of the invention will become apparent to those skilled in the art from the following discussion, taken in conjunction with the accompanying drawings, in which:

FIGURES OF THE INVENTION

The following is a discussion and description of preferred specific embodiments of the pneumatic soil penetrator and chemical applicator assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Figures 1, 2, 3:
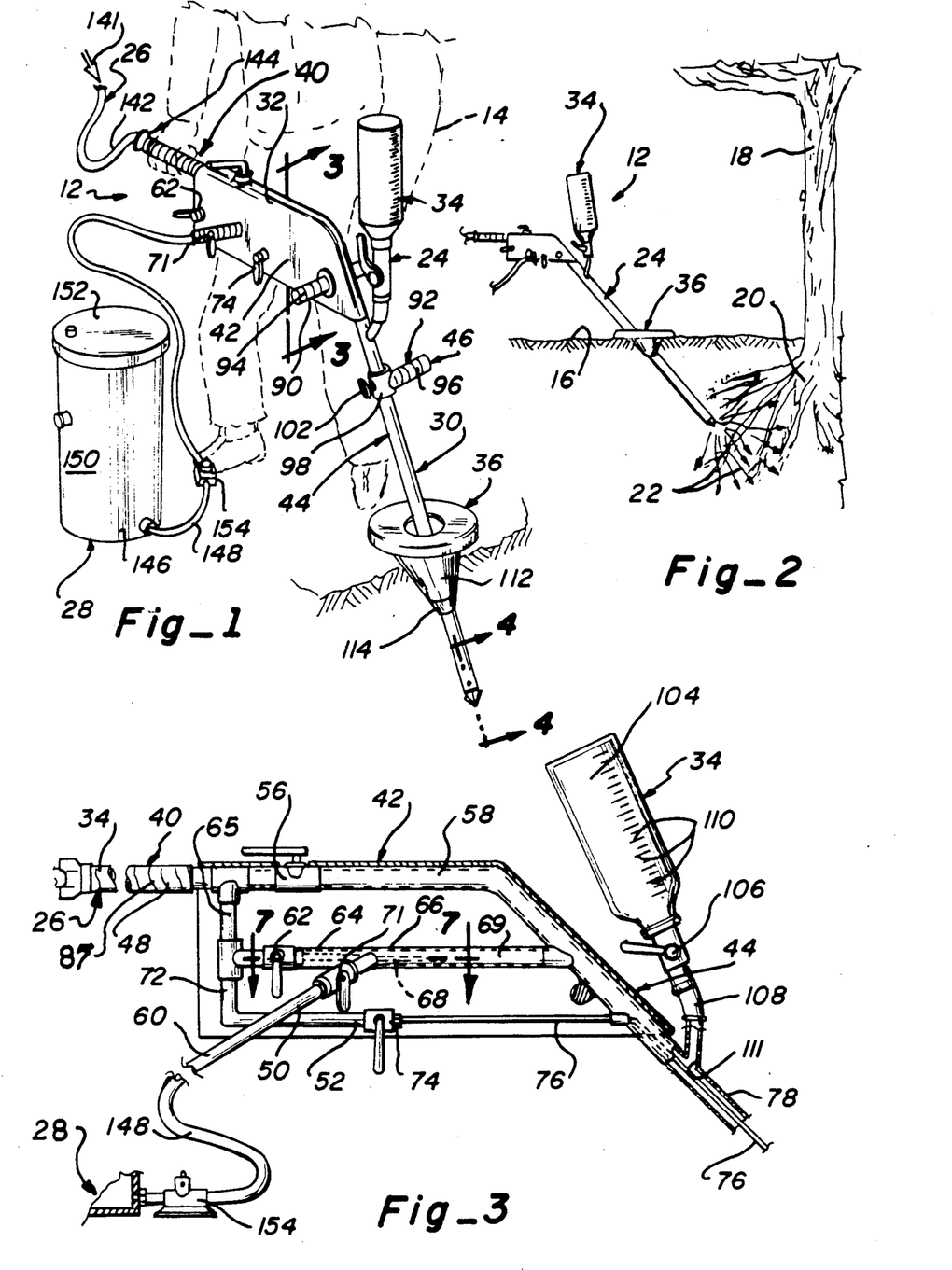
FIG. 1 is a perspective view of a pneumatic soil penetrator and chemical applicator assembly of this invention illustrating a fragmentary view of an operator in dotted lines holding an applicator gun means in a normal usage condition.
FIG. 2 is a fragmentary side elevational view illustrating use of the pneumatic soil penetrator and chemical applicator assembly of this invention as applying a chemical toward a root member system of a tree member.
FIG. 3 is an enlarged fragmentary sectional view taken along line 3—3 in FIG. 1.

Referring to the drawings in detail and, in particular to FIGS. 1 and 2 jointly, a pneumatic soil penetrator and chemical applicator assembly of this invention, indicated generally at 12, is shown as being utilized by an operator 14. The operator 14 is shown as inserting an outer end of the pneumatic soil penetrator and chemical applicator assembly 12 through an upper surface in a soil area 16 so as to be penetrated adjacent a tree member 18 and, more specifically, adjacent the root members 20 to dispense a chemical 22 thereabout in a manner to be described in detail.

The pneumatic soil penetrator and chemical applicator assembly 12 includes (1) a penetrator and applicator means 24; (2) a pneumatic supply means 26 operably connected to the penetrator and applicator means 24 to provide a fluid flow thereto; and (3) a chemical supply means 28 operably connected to provide the liquid or granular chemical 22 to the penetrator and applicator means 24.

The penetrator and applicator means 24 includes an applicator gun means 30 including (1) a main gun assembly 32; (2) an auxillary chemical supply assembly 34 mounted on the main gun assembly 32 to provide a limited volume of chemical 22 thereto; (3) an air deflector assembly 36 mounted on an outer end of the main gun assembly 32 for reasons to be explained; and (4) a directional broadcaster assembly 38 (FIG. 11) connected to an outer end of the main gun assembly 32 for reasons to be noted.

As noted in FIG. 1, the main gun assembly 32 includes (1) a primary inlet assembly or means 40; (2) a housing cover assembly 42 to enclose the primary inlet assembly 40; (3) a main discharge assembly 44 connected to the primary inlet assembly 40; and (4) a control handle assembly 46 operable to aid overall conveyance and movement of this invention as will be noted.

The primary inlet assembly or means 40 includes (1) a fluid inlet assembly or means 48; (2) a chemical inlet assembly or means 50; and (3) a fluid penetrator assembly or means 52. The fluid inlet assembly 48 includes a fluid inlet tube member 54 which is preferrably connected by a quick disconnect coupling 144 to the pneumatic supply means 26. A first on/off control valve member 56 is mounted in the inlet tube member 54 and connected through a fluid tube member 58 outwardly to the main discharge assembly 44.

The chemical inlet assembly 50 is provided with (1) a connector tube member 60 interconnected to the chemical supply means 28; (2) a fluid supply tube 65 connected to the fluid inlet assembly 48; (3) a second on/off control valve member 62 mounted in the fluid supply tube 65; and (4) a venturi valve assembly 64 mounted between the on/off control valve 62 and the main discharge assembly 44 of the chemical inlet assembly 50.

Figures 4, 5, 6, 7, 8:
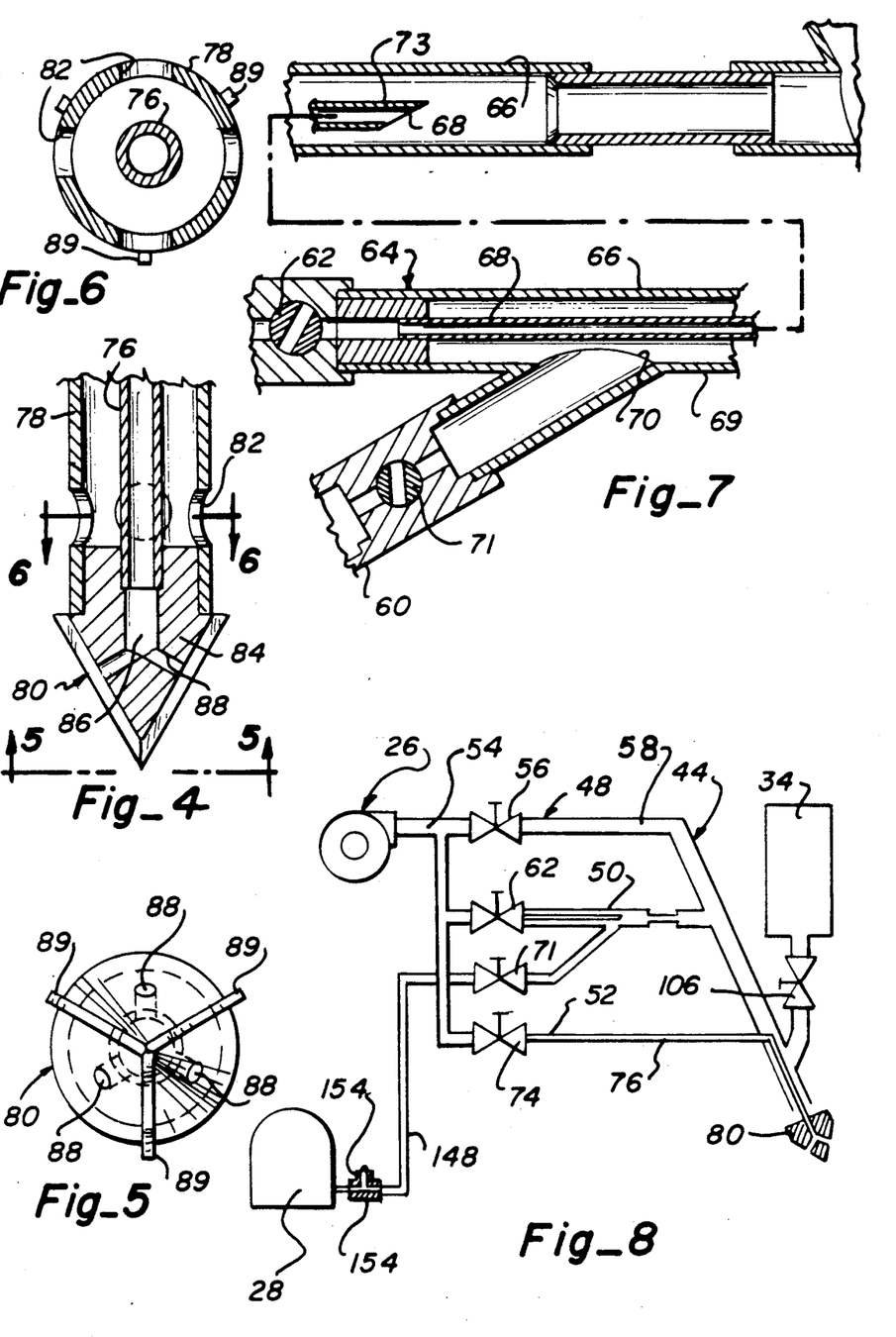
FIG. 4 is an enlarged fragmentary sectional view taken along line 4—4 in FIG. 1.
FIG. 5 is a plan view taken along line 5—5 in FIG. 4.
FIG. 6 is a sectional view taken along line 6—6 in FIG. 4.
FIG. 7 is an enlarged fragmentary sectional view taken along line 7—7 in FIG. 3.
FIG. 8 is a schematic diagram illustrating potential fluid and chemical flow through various control members of the pneumatic soil penetrator and chemical applicator assembly of this invention.

As noted in FIG. 7, the venturi valve assembly 64 includes (1) an outer transfer tube 66; (2) an inner venturi tube 68 connected to the second on/off control valve member 62; (3) a chemical inlet tube and opening 70 to provide the chemical 22 to be supplied through a third on/off control valve member 71; and (4) a discharge tube member 69 integral with the transfer tube 66 and connected to the main discharge assembly 44.

As noted in FIG. 7, the venturi tube 68 has a discharge end section 73 positioned outwardly of the chemical inlet opening 70 which creates a vacuum pressure due to the fluid flow to cause a suction within the chemical inlet opening 70 to draw the desired chemical 22 from the chemical supply means 28 in a manner to be described.

As noted in FIG. 3, the fluid penetrator assembly 52 is operable to receive inlet fluid pressure from the pneumatic supply means 26 through (1) the fluid supply tube 65; (2) a connector tube section 72; (3) a fourth on/off control valve member 74; and (4) an inner fluid supply tube 76. This inner fluid supply tube 76 is directed into and positioned centrally of the main discharge assembly 44 for reasons to become obvious.

The main discharge assembly 44 includes (1) an outer main outer discharge tube member 78 interconnected to the fluid conveyance tube member 58, the discharge tube member 69, and the inner fluid supply tube 76; and (2) a discharge penetrator assembly 80 mounted on an outer end of the main discharge tube member 78.

As best noted in FIGS. 4-5, the discharge penetrator assembly 80 is provided with lateral, equally spaced, discharge openings 82 and an integral tapered penetrator member 84. The four (4) discharge openings 82 permit discharge of fluid and conveyed chemical 22 to be broadcast laterally and outwardly therefrom.

The tapered penetrator member 84 includes a central discharge channel 86 connected to the fluid supply tube 76 to receive fluid flow and discharge same laterally through discharge lines and openings 88. An outer surface of the tapered penetrator member 84 is provided with spaced fin members 89 to aid in directing fluid flow and soil penetration. The purpose and function of the inner fluid supply tube 76 is to provide a means to supply high pressure fluid flow for penetration of the soil area 16 prior to dispensing of the chemical 22 therein in a manner to be explained.

As noted in FIG. 1, the control handle assembly 46 includes (1) a first handle member 87; (2) a dual handle assembly 90; and (3) an adjustable handle assembly 92. The first handle member 87 provides an outer grip portion about the fluid inlet tube member 54.

The dual handle assembly 90 is provided with a lateral extension from each side of the housing cover assembly 42 with each provided a grip member 94 thereon. The dual handle assembly 90 is such that it can be grasped by an operator 14 on either side thereof for use by either right or left handed operators 14.

The adjustable handle assembly 92 includes a handle grip member 96 integral with a connector tube member 98. The connector tube member 98 is telescopingly mounted about the main discharge tube member 78 of the main discharge assembly 44 and can be axially adjusted thereon. Thereupon, a thumb screw member 102 is threadably mounted in an opening in the connector tube member 98 and operable in a conventional manner to anchor the adjustable handle assembly 92 in an axial position thereon for ease of usage by the operator 14.

The auxillary chemical supply assembly 34 includes (1) a supply bottle member 104 preferrably constructed of a transparent plastic material; (2) a fifth on/off control valve member 106 connected to the supply bottle member 104 to control dispensing of chemical 22 therefrom; (3) a chemical supply line 108 connected from the fifth on/off valve member 106 to the discharge tube member 78 of the main discharge assembly 44.

The supply bottle member 104 is provided with graduation indicia 110 to note both initial content thereof and rate of subsequent chemical 22 dispensing therefrom.

Figures 9, 10:
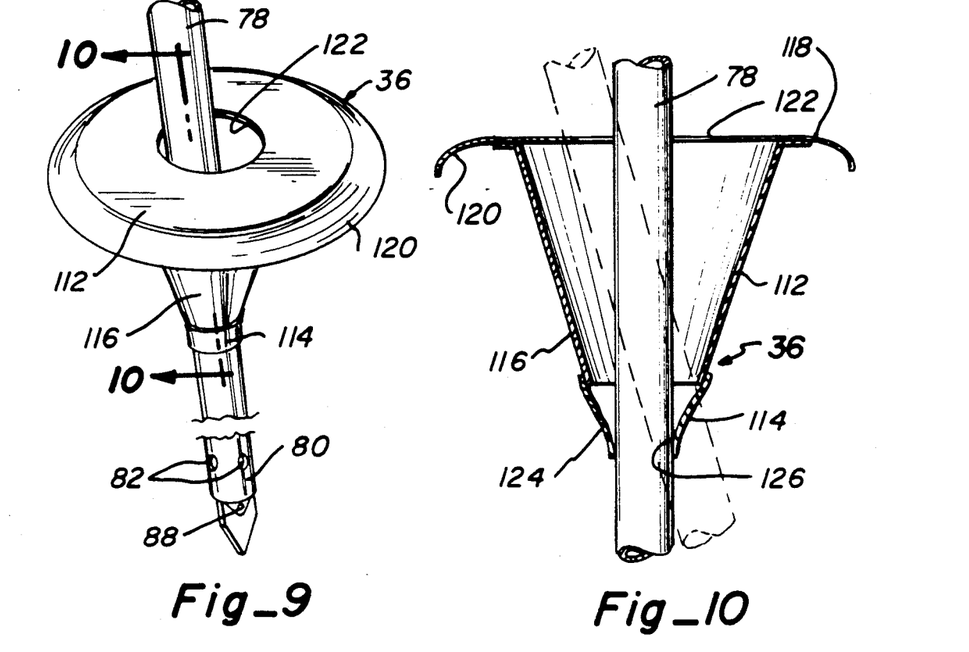
FIG. 9 is a perspective view illustrating an air deflector assembly of the pneumatic soil penetrator and chemical applicator assembly of this invention.
FIG. 10 is a fragmentary section view taken along line 10—10 in FIG. 9.

As noted in FIGS. 9 and 10, the air deflector assembly 36 is provided with (1) a conical main body member 112; and (2) a flexible connector member 114 secured to the conical main body member 112 and engagable about an outer surface of the main discharge tube member 78 in a sealing relationship.

The conical main body member 112 is provided with a tapered side wall 116 connected at an upper surface thereof to a top wall member 118. The top wall member 118 is provided with an arcuate outer downwardly inclined peripheral edge 120 and a central opening 122. The central opening 122 allows the main discharge tube member 78 to pivot about the connector member 114 as noted by dotted lines in FIG. 10.

The flexible connector member 114 is preferrably constructed of a resilient rubber material and includes a conical body section 124 having a connector opening 126. The connector opening 126 is adapted to mount in a sealing engagement against an outer surface of the main discharge tube member 78. This allows for pivotal movement plus sealing engagement with a top surface of the soil area 16 to maintain fluid flow directed within a hole to be penetrated by the discharge penetrator assembly 80 in a manner to be described.

Figure 12:
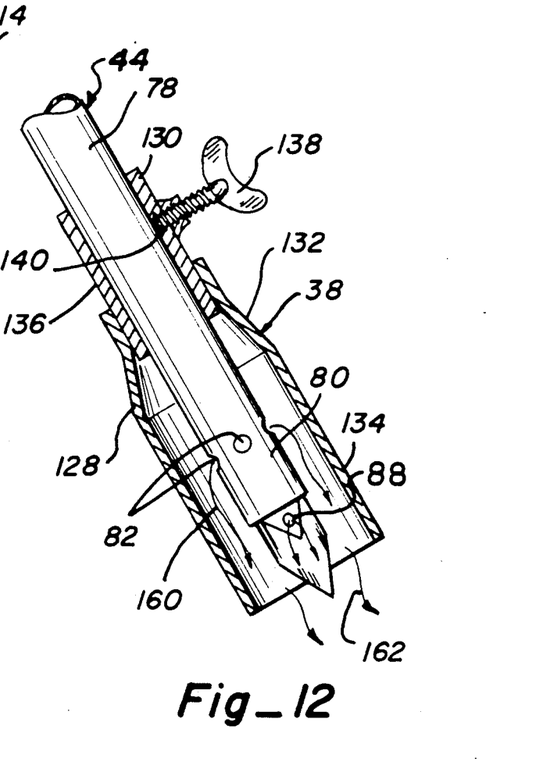
FIG. 12 is an enlarged fragmentary sectional view taken along line 12—12 in FIG. 11.

As noted in FIG. 12, a feature of this invention is the use of the directional broadcaster assembly 38 which includes a broadcaster tube member 128 connected through a connector assembly 130 to an outer end of the main discharge tube member 78 of the main discharge assembly 44. The broadcaster tube member 128 has a tapered side wall 132 integral with an enlarged cylindrical side wall 134. The cylindrical side wall 134 is spaced outwardly but around an outer portion of the discharge penetrator assembly 80 to direct the fluid and chemical flow downwardly as noted by arrows 162.

The connector assembly 130 includes a connector tube 136 telescopingly mounted within and welded to the tapered side wall 132 and usable with a thumb screw member 138. More particularly, the thumb screw member 138 is mounted within a threaded anchor opening 140 so as to be engagable with an outer surface of the main discharge tube member 78 for securing in an adjusted axial position relative thereto.

The pneumatic supply means 26 includes an air compressor assembly (not shown) whereupon air under high pressure can be supplied as noted by the inlet air flow arrow 141 in FIG. 1. The air compressor assembly can utilize air storage tanks to provide a sufficient supply of air plus being readily portable if so desired.

The inlet air flow at 141 flows through the inlet line 142 and the quick disconnect assembly 144 to supply the air which is controlled by the first on/off control valve member 56, the second on/off control valve member 62, and the fourth on/off control valve member 74 as noted in FIGS. 3 and 8.

As seen in FIG. 1, the main chemical supply means 28 includes (1) a chemical supply tank or barrel 146; and (2) a chemical discharge line 148 to interconnect same to the third on/off control valve member 71 of the chemical inlet assembly 50.

The chemical supply tank 146 includes a main barrel member 150 having a top cover member 152 thereon. The chemical 22 placed therein can be supplied under pressure or gravity feed outwardly through the chemical discharge line 148 having a foot control member 154 mounted therein. The foot control member 154 is of a normally opened type to permit outside air therein but can be closed by covering with a foot member of the operator 14 so that suction would then pull the chemical 22 out of the main barrel member 150. The actual operation of this foot control member 154 will be explained in detail.

USE AND OPERATION OF THE INVENTION

In the use and operation of the pneumatic soil penetrator and chemical applicator assembly 12 of this invention as best shown in FIGS. 1 and 2, the penetrator and applicator means 24 is interconnected to the pneumatic supply means 26 and the chemical supply means 28.

The pneumatic supply means 26 can have an air compressor assembly operated by a conventional 120 volt power supply or can supply air by the use of an air storage tank. We shall first use the chemical supply means 28 to which a granular type chemical 22 can be added. We will later discuss the use of the auxillary chemical supply assembly 34 to apply lesser amounts of chemical 22 through the applicator gun means 30 of this invention.

On utilizing the applicator gun means 30 to supply chemical 22 to the root members 20 of the tree member 18, it is obvious that the operator 14 would first apply an outer end of the discharge penetrator assembly 80 of a main discharge assembly 44 against a top surface of the soil area 16.

The operator 14 would open the fourth on/off control valve member 74 which would allow the high pressure air flow to be directed through the inner fluid supply tube 76 for discharge through the discharge channel 86 and discharge opening 88. This would then act as a driving force to aid in penetrating the soil area 16 as the operator 14 can press downwardly through the main gun assembly 32 to achieve penetration as noted in FIGS. 1 and 2. On reaching a certain depth, it is noted that the air deflector assembly 36 would seal with a top surface of the soil area 16 plus it can be adjusted axially on the main discharge tube member 78.

Next, the operator 14 would close the fourth on/off control valve member 74 and open the second on/off control valve member 62 to provide an air flow outwardly through the venturi valve assembly 64 into the main discharge assembly 44. More particularly, the second on/off control valve member 62 can be opened to a controlled amount to send the air flow through the inner venturi tube 68 to create vacuum pressure at the channel inlet opening 70. Then, the operator 14 can open the third on/off control valve member 71 to create a venturi action and suction within the discharge line 148 back to the chemical supply tank 146.

At this time, it may be desirable for the operator 14 to regulate the fluid and chemical flow through the control valve members 62 and 71 with use of the foot control member 154 and having the control valve members 56 and 74 closed.

As the foot control member 154 is normally in an open condition, this would create air flow through the line 148 from the atmosphere due to the venturi action of the venturi valve assembly 64. The operator 14 would, when wanting to convey and discharge the chemical 22, place its foot on the foot control member 154 to close same. This would then create a suction in the chemical discharge line 148 into the chemical supply tank 146. The chemical 22 flows within the chemical discharge line 148 from the chemical supply means 28 and is conveyed outwardly through the discharge assembly 44 to be discharged laterally through the discharge openings 82 in the discharge penetrator assembly 80.

It is noted that use of the air deflector assembly 36 allows the operator 14 to move the main discharge tube member 78 to various angles as noted in dotted lines in FIG. 10 for directing the chemical 22 toward the root members 20. The air deflector assembly 36 also acts to seal the hole created to direct the air and chemical flow downwardly and laterally.

In certain cases, it may be desirable to utilize the pneumatic soil penetrator and chemical applicator assembly 12 of this invention to dispense a smaller and controlled amount of chemical 22, such as a polymer chemical, through the auxillary chemical supply assembly 34. On utilizing the invention in this manner, it is obvious that the second, third, and fourth on/off control valve members 62, 71, 74 are placed in the "off" condition.

After penetrating the soil area 16 as previously described and as shown in FIG. 2, a selected air flow can be directed through the first on/off control valve member 56. The chemical 22 from the auxillary chemical supply assembly 34 will be supplied on opening of the fifth on/off control valve member 106 to provide a chemical flow by vacuum and gravity forces outwardly through the chemical supply line 108 and for discharge through the discharge openings 82 in the discharge penetrator assembly 80.

Figure 11:
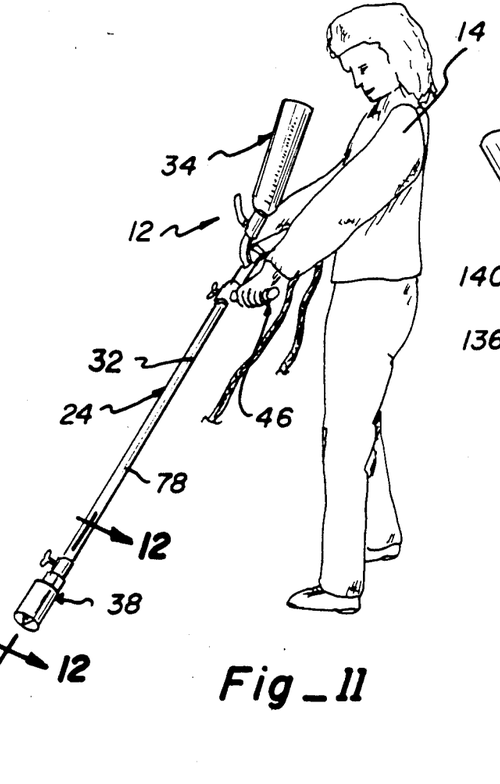
FIG. 11 is a perspective view of the pneumatic soil penetrator and chemical applicator assembly of this invention utilized by an operator and having a directional broadcaster assembly mounted on an outer end thereof.

Another use of the pneumatic soil penetrator and chemical applicator assembly 12 of this invention is by utilization of the directional broadcaster assembly 38 as shown in FIGS. 11 and 12. The directional broadcaster assembly 38 is mounted on an outer surface of the main discharge tube member 78 of the main discharge assembly 44 and axially adjusted thereon. When reaching the final axial adjustment, the thumb screw member 138 mounted within the anchor opening 140 is tightened to secure against the discharge tube member 78. It is seen that the proper axial adjustment, as noted in FIG. 12, is to have the outer cylindrical side wall 134 placed around the discharge openings 82 and 88 so as to direct any air flow and chemical 22 therefrom outwardly and downwardly so as to broadcast the chemical 22 in a controlled area for efficient use in certain chemical application situations.

the pneumatic soil penetrator and chemical applicator assembly of this invention has numerous different types of uses and can be supplied with a large chemical supply means or a controlled auxillary chemical supply assembly.

It is noted that the pneumatic soil penetrator and chemical applicator assembly of this invention is heavy duty but is of light weight construction; easy to transport and utilize without external power sources requiring only an air storage tank; sturdy in construction; economical to manufacture; and diversified in use thereof.

While the invention has been described in conjunction with preferred specific embodiments thereof, it will be understood this description is intended to illustrate and not to limit the scope of the invention, which is defined by the following claims:

I claim:
1. A pneumatic soil penetrator and chemical applicator assembly to inject a chemical under a surface of a soil area, comprising:
   (a) an applicator gun means including a primary inlet means connected to a main discharge means to selcltively and independently direct controlled amounts of an inlet fluid and a chemical through said main discharge means;
   (b) a fluid supply means connected to said primary inlet means;
   (c) a chemical supply means connected to said primary inlet means; and
   (d) said primary inlet means includes first valve means to independently control flow of fluid only to said main discharge means; second valve means to independently control flow from a chemical inlet means; and third valve means to independently control flow of fluid to a fluid penetrator means;
   whereby said primary inlet means is selectively and independently operable to convey chemical from said chemical supply means through said chemical inlet means, supply fluid to said fluid penetrator means to open a hole in the soil area, and dispense the fluid and chemical laterally of said main discharge means.

2. A pneumatic soil penetrator and chemical applicator assembly as described in claim 1, wherein:
   (a) said chemical supply means includes a chemical supply tank to receive and hold a chemical therein, and connected by a chemical discharge line through a control member to said chemical inlet means; and
   (b) said control member being normally opened to atmospheric pressure and being moveable to the closed condition to create an enclosed line for suction in said chemical discharge line to remove chemical from said chemical supply tank to said primary inlet means for subsequent discharge through said main discharge means.

3. A pneumatic soil penetrator and chemical applicator assembly as described in claim 1, wherein:
   (a) said chemical supply means includes an auxillary chemical supply assembly connected to said main discharge means;
   (b) said auxillary supply means includes a chemical supply bottle member connected through a third valve means and a chemical supply line to said main discharge means; and
   (c) said third valve means operable to be moved to an adjusted open condition to allow chemical within said supply bottle member to move downwardly for discharge through said main discharge means in a controlled manner.

4. A pneumatic soil penetrator and chemical applicator assembly as described in claim 1, including:
   (a) said main discharge means including a main discharge tube member having a discharge penetrator assembly mounted on an outer end thereof;
   (b) said discharge penetrator assembly includes a tapered penetrator means having a discharge opening for discharging a mixture of chemical and fluid under pressure; and
   (c) a central discharge channel interconnected to a fourth valve means to direct fluid flow only to said penetrator means connected to said discharge channel for movement therefrom to aid in soil penetration.

5. A pneumatic soil penetrator and chemical applicator assembly as described in claim 4, wherein:
   (a) said discharge penetrator assembly having a tapered penetrator member divided through laterally extended fin members to multiple discharge areas for discharging fluid under pressure laterally to aid in penetrating and drilling of a hole in the soil area.

6. A pneumatic soil penetrator and chemical applicator assembly as described in claim 1, including:
   (a) an air deflector assembly mounted about an outer surface of said main discharge means;
   (b) said air deflector assembly having a conical main body member connected to a flexible connector member;
   whereby said conical main body member is moved through connection of said flexible connector member laterally of said main discharge means and axially thereof so as to provide a seal with a hole in the soil area being penetrated to maintain the fluid pressure therewithin working in a downwardly direction.

7. A pneumatic soil penetrator and chemical applicator assembly as described in claim 6, wherein:
   (a) said air deflector assembly having a top cover member mounted on said conical main body member and having an outer tapered surface to provide a seal with the soil area about the hole being penetrated therewithin by allowing lateral movement of said main discharge means.

8. A pneumatic soil penetrator and chemical applicator assembly as described in claim 1, including:
   (a) a directional broadcaster assembly releasably connected to an mounted about outer end of said main discharge means including a broadcaster tube member releasably connected by a connector assembly to said main discharge means and adjustable axially relative to said main discharge means and operable to maintain chemical and fluid flow in a downward direction as received from said first valve means, said second valve means, and said third valve means of said primary inlet means.

9. A pneumatic soil penetrator and chemical applicator assembly as described in claim 1, wherein:
   (a) said applicator gun means includes a main gun assembly having a control handle assembly connected to said main gun assembly having an adjustable handle assembly axially moveable to an adjusted position and secured to said main discharge means so as to provide an adjustable feature and lateral support thereto.

10. A pneumatic soil penetrator and chemical applicator assembly as described in claim 9, wherein:
    (a) said control handle assembly includes a dual handle assembly extended laterally on both sides of said applicator gun means and being grasped for easy of control and operation thereof; and
    (b) said control handle assembly includes a laterally extended handle member for ease of grasping for use in combination with said dual handle assembly and said adjustable handle assembly for controlled manipulation and operation thereof.

11. A pneumatic soil penetrator and chemical applicator assembly as described in claim 1, wherein:
    (a) said inlet fluid is pressurized air.

12. A pneumatic soil penetrator and chemical applicator assembly as described in claim 1, wherein:
    (a) said chemical is a granular material being used and transferred in a solid state.

13. A pneumatic soil penetrator and chemical applicator assembly to inject chemical and fluid under pressure under a surface of a soil area for purposes of aeration, fertilizing, weed control, chemical injection, and the like, comprising:
    (a) an applicator gun means connected (1) to a fluid supply means to supply fluid pressure thereto; and (2) to a chemical supply means to pick up and receive a chemical to dispense therefrom;
    (b) said fluid supply means operable to supply fluid under pressure to said applicator gun means;
    (c) said chemical supply means connected to a primary inlet means of said applicator gun means;
    (d) said primary inlet means includes (1) a fluid inlet assembly operably connected through a first control valve member to a main discharge assembly; (2) a chemical inlet assembly connected through a second control valve member and a third control valve member to said main discharge assembly; and (3) a fluid penetrator assembly connected to said fluid inlet assembly and connected through a fourth control valve member to a fluid supply tube mounted within said main discharge assembly;
    (e) said chemical inlet assembly includes a venturi valve assembly having a venturi member therewithin operably associated with said chemical inlet assembly;
    (f) said second control valve member operable to provide fluid flow from said fluid inlet assembly through said venturi valve member to provide a suction pressure to said chemical supply means when said third control valve member is open to pick up and discharge the chemical outwardly through said main discharge assembly;
    (g) said main discharge assembly includes a main discharge tube member mounted about said fluid supply tube and having a discharge penetrator assembly mounted on an outer end thereof; and
    (h) said discharge penetrator assembly includes discharge openings to receive and discharge the chemical plus fluid pressure therefrom and a central discharge channel connected to said fluid supply tube to selective and independently provide high pressure fluid flow to achieve a penetration operation in the soil area.

14. A pneumatic soil penetrator and chemical applicator assembly as described in claim 13, wherein:
    (a) said chemical supply means includes a chemical supply tank connected by a chemical discharge line through a foot control valve to said chemical inlet assembly to supply a controlled amount of chemical under suction pressure thereto.

15. A pneumatic soil penetrator and chemical applicator assembly as described in claim 13, wherein:
    (a) said chemical supply means includes an auxillary chemical supply assembly having a supply bottle member connected through a control valve in a chemical supply line to a portion of said main discharge assembly to provide controlled amounts of chemical supplied therethrough.

16. A pneumatic soil penetrator and chemical applicator assembly as described in claim 13, wherein:
    (a) said supply bottle member of a clear plastic construction having indicator indicia thereon to closely monitor the dispensing, amount, and control of the chemical therefrom.

17. A pneumatic soil penetrator and chemical applicator assembly as described in claim 13, including:
    (a) an air deflector assembly mounted about said main discharge assembly by a flexible connector member operable (1) to seal with a hole drilled in the soil area by said discharge penetrator assembly; and (2) to seal therewithin to direct the fluid flow therethrough downwardly to create additional openings and aeration in the soil area.

18. A pneumatic soil penetrator and chemical applicator assembly as described in claim 17, wherein:
    (a) said air deflector assembly having a conical main body member connected to a flexible connector member to permit movement laterally of said main discharge assembly to change direction of penetration of the fluid flow therein.

19. A pneumatic soil penetrator and chemical applicator assembly as described in claim 13, including:
    (a) a directional broadcaster assembly connected to and mounted about an outer end of said main discharge assembly and being axially moveable thereon and operable to direct a mixture containing fluid flow and chemical from said discharge openings in said discharge penetrator assembly and in said discharge channel downwardly therefrom.

20. A pneumatic soil penetrator and chemical applicator assembly to inject chemical and fluid under pressure under a surface of a soil area for purposes of aeration, fertilizing, weed control, chemical injection, and the like, comprising:
(a) an applicator gun means including a main gun assembly with a primary inlet assembly connected to a main discharge assembly;
(b) said primary inlet assembly includes a fluid inlet assembly, a chemical inlet assembly and a fluid penetrator assembly;
(c) a fluid supply means connected to said fluid inlet assembly, said chemical inlet assembly, and said fluid penetrator assembly;
(d) a chemical supply means connected to said chemical inlet assembly to selectively supply chemical thereto;
(e) a control means including (1) a first control means connected to said fluid inlet assembly to selectively supply fluid under pressure to said main discharge assembly; (2) a second control means connected to said chemical inlet assembly to selectively supply fluid under pressure thereto for discharge out said main discharge assembly; (3) a third control means connected to said chemical supply means and said chemical inlet assembly to selectively supply chemical for discharge out said main discharge assembly when said second control means is open to supply fluid to said chemical inlet assembly; and (4) a fourth control means connected to said fluid supply means and a main discharge tube member of the main discharge assembly which is connected to a discharge penetrator assembly operable to use fluid pressure only to drill a hole in the soil area.

* * * * *